E. SCHNEIDER.
APPARATUS FOR EFFECTING THE ADJUSTMENT OF THE TRAINING MOVEMENT OF GUN CARRIAGES MOUNTED ON RAILWAY TRUCKS.
APPLICATION FILED SEPT. 6, 1917.
1,310,140.
Patented July 15, 1919.
6 SHEETS—SHEET 1.
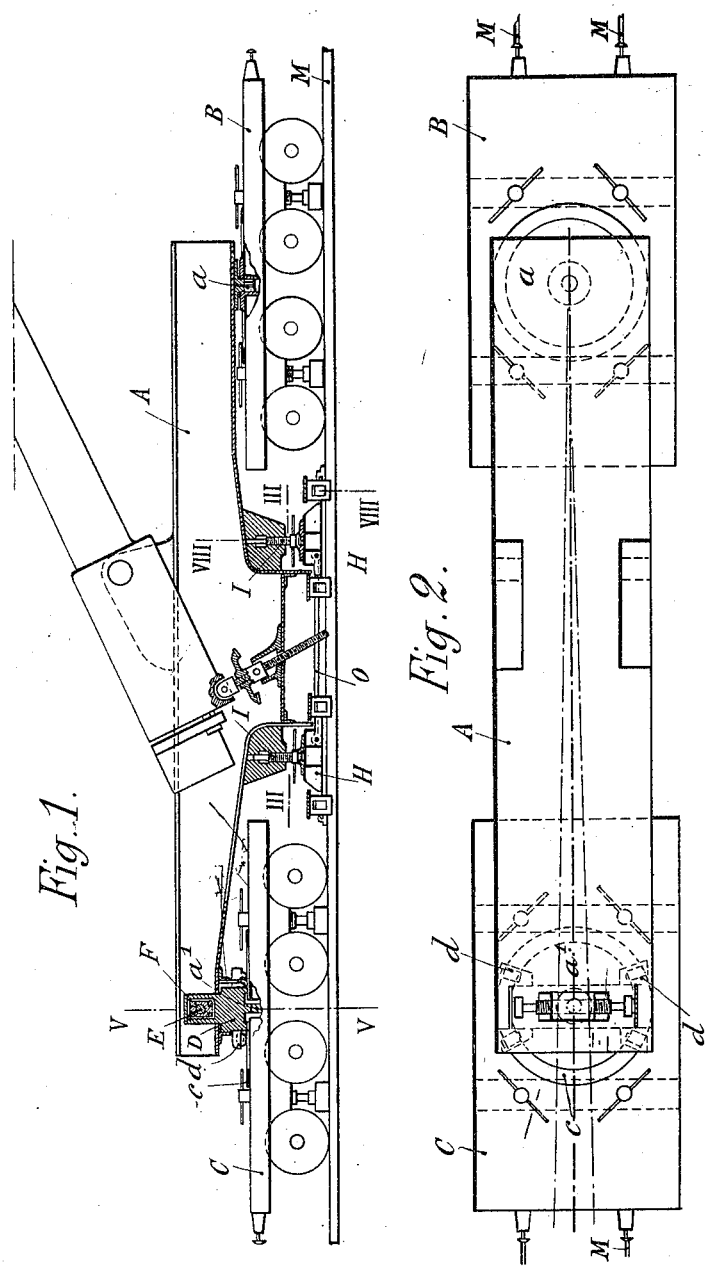

E. SCHNEIDER.
APPARATUS FOR EFFECTING THE ADJUSTMENT OF THE TRAINING MOVEMENT OF GUN CARRIAGES MOUNTED ON RAILWAY TRUCKS.
APPLICATION FILED SEPT. 6, 1917.
1,310,140.
Patented July 15, 1919.
6 SHEETS—SHEET 2.
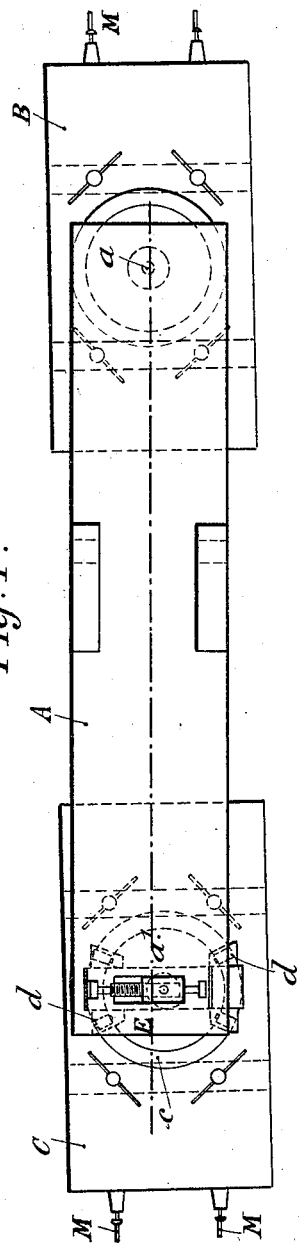
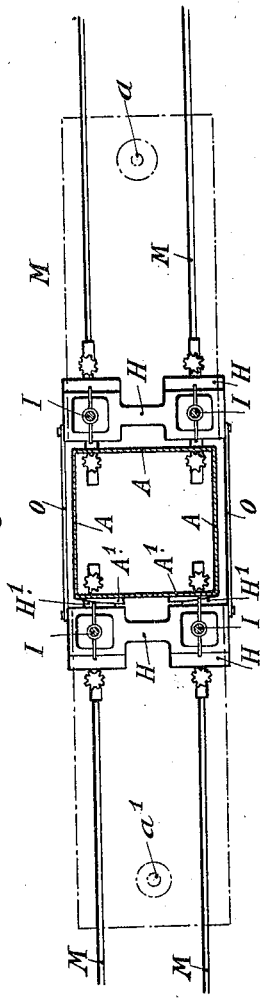

E. SCHNEIDER.
APPARATUS FOR EFFECTING THE ADJUSTMENT OF THE TRAINING MOVEMENT OF GUN CARRIAGES MOUNTED ON RAILWAY TRUCKS.
APPLICATION FILED SEPT. 6, 1917.

1,310,140.

Patented July 15, 1919.
6 SHEETS—SHEET 3.

E. SCHNEIDER.
APPARATUS FOR EFFECTING THE ADJUSTMENT OF THE TRAINING MOVEMENT OF GUN CARRIAGES MOUNTED ON RAILWAY TRUCKS.
APPLICATION FILED SEPT. 6, 1917.

1,310,140.

Patented July 15, 1919.
6 SHEETS—SHEET 4.

Inventor
Eugène Schneider
by Mauro, Cameron, Lewis & Massie
Attorneys.

E. SCHNEIDER.
APPARATUS FOR EFFECTING THE ADJUSTMENT OF THE TRAINING MOVEMENT OF GUN CARRIAGES MOUNTED ON RAILWAY TRUCKS.
APPLICATION FILED SEPT. 6, 1917.

1,310,140.

Patented July 15, 1919.
6 SHEETS—SHEET 5.

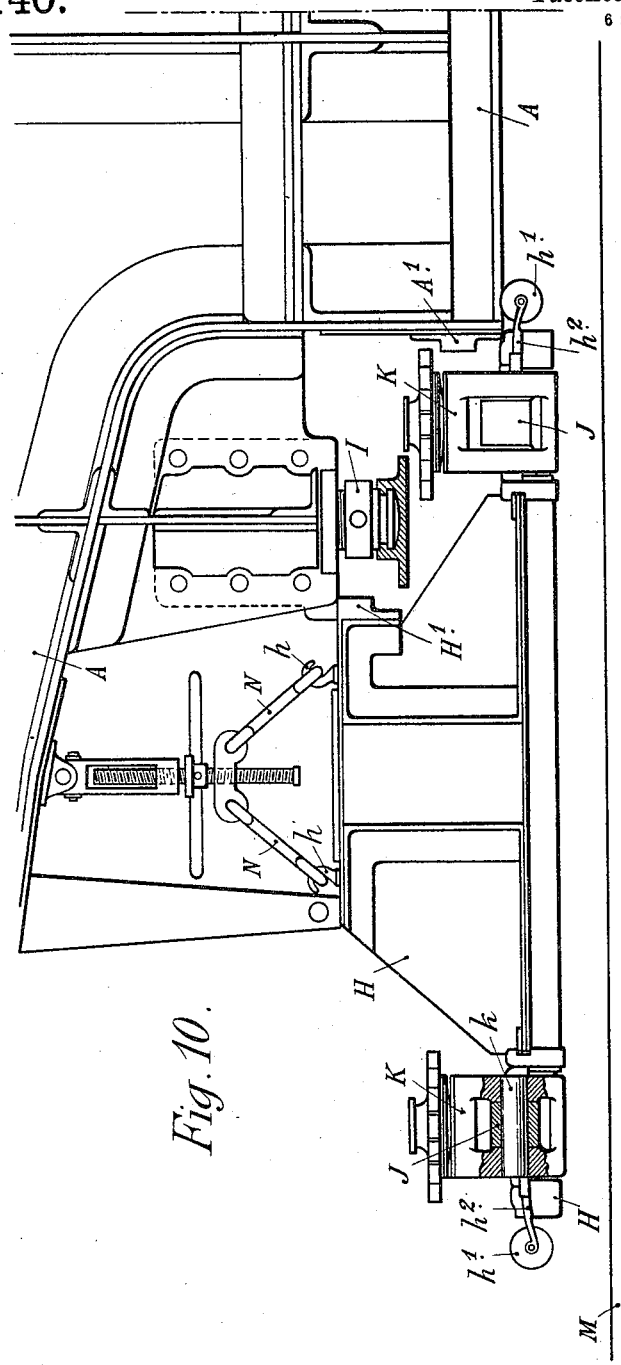

UNITED STATES PATENT OFFICE.

EUGÈNE SCHNEIDER, OF LE CREUZOT, FRANCE, ASSIGNOR TO SCHNEIDER & CIE., OF PARIS, FRANCE, A LIMITED JOINT-STOCK COMPANY OF FRANCE.

APPARATUS FOR EFFECTING THE ADJUSTMENT OF THE TRAINING MOVEMENT OF GUN-CARRIAGES MOUNTED ON RAILWAY-TRUCKS.

1,310,140.  Specification of Letters Patent.  Patented July 15, 1919.

Application filed September 6, 1917. Serial No. 189,948.

*To all whom it may concern:*

Be it known that I, EUGÈNE SCHNEIDER, a citizen of the French Republic, and a resident of Le Creuzot, Saône-et-Loire, France, have invented a new and useful Improvement in Apparatus for Effecting the Adjustment of the Training Movement of Gun-Carriages Mounted on Railway-Trucks, which invention is fully set forth in the following specification.

This invention has for its object to provide improved apparatus for effecting the adjustment of the training movement of gun carriages carried on railway trucks when firing the gun direct from the railway said gun carriages comprising a girder-like structure that constitutes the gun carriage proper, being supported by means of vertical pivots on two or more railway trucks.

The improved apparatus consists in a combination of means for enabling the girder-like gun carriage with the gun and accessories carried by the said carriage to be rotated on the fore-pivot of the said carriage without altering the position of the railway trucks or of the supports for the gun carriage on the railway.

According to this invention the rear pivot of the girder-like gun carriage is formed in one piece or fixed to a turntable mounted on the supporting truck, and the girder-like carriage is adapted to slide over said turntable, by means of a transverse screw rotating in and moving longitudinally through a nut which is pivoted by means of two vertical trunnions in a recess formed in the said rear pivot.

On the other hand the devices for supporting the gun carriage on the railway comprise independent soleplates that constitute the supports proper and are adapted to be clamped upon the railway. These soleplates are coupled by means of tie rods or connecting rods when the gun is in position for firing, in such a manner as to clamp the girder-like carriage between them and thus be carried along by the latter in its sliding movement in the recoil. The said supporting devices form with their upper surfaces, supports for screw-jacks carried by the girder-like carriage, when the gun is being fired.

An embodiment of this invention is illustrated by way of example in the accompanying drawings in which:—

Figure 1 is a side elevation partly in vertical section of a gun carriage supported on trucks, constructed according to this invention, the parts being shown in the position they occupy when the gun is being fired.

Fig. 2 is a plan thereof.

Fig. 3 is a horizontal longitudinal section on the line III—III of Fig. 1.

Fig. 4 is a plan corresponding to Fig. 2, showing the gun carriage after being turned on its fore-pivot for the purpose of correcting or adjusting the training of the carriage, and consequently of the gun.

Fig. 10 is a similar partial side elevation showing the supporting device raised for traveling.

In all these figures, A is a girder-like gun carriage supported on two railway trucks B and C by means of two vertical pivots. The fore-pivot $a$ is of the usual construction. The rear pivot $a^1$ is formed in one piece with or fixed to a turntable D which is adapted to revolve on a circular track $c$ of the rear railway truck C by means of rollers $d$. This turntable D serves as a slideway for the rear end of the girder A in the movements which it is caused to make around its fore-pivot $a$, for the purpose of adjusting the training of the carriage and consequently of the gun. These sliding movements are produced according to this invention by the movement of a transverse screw E journaled in the girder A, in a nut F which can pivot in its turn by means of two vertical trunnions $f$, in a box G held in a recess formed in the center of the turntable-pivot D—$a^1$. Rotary motion can be imparted to the screw E by means of chains or other gearing ($e$—$e^1$ $e^2$—$e^3$).

Figure 5:
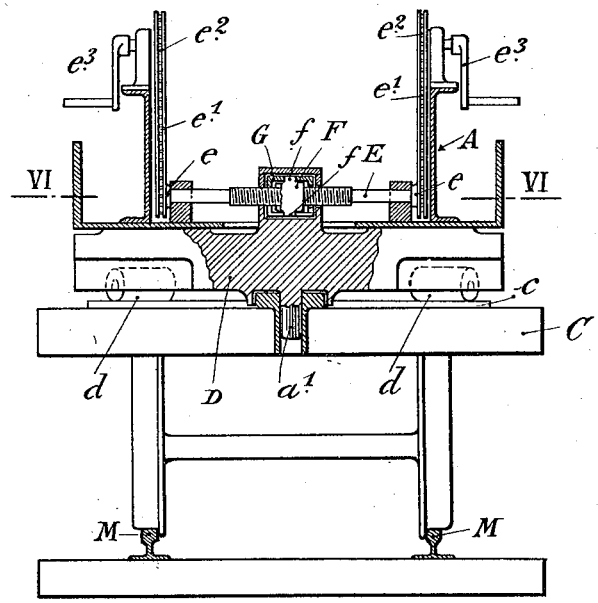
Fig. 5 is a vertical cross section drawn to a larger scale on the line V—V of Fig. 1.
Figure 6:
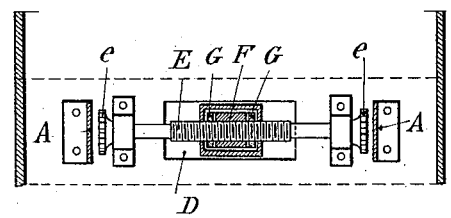
Fig. 6 is a horizontal section on the line VI—VI of Fig. 5.
Figure 7:
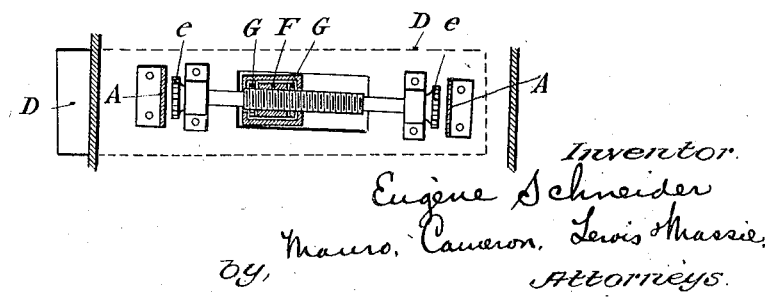
Fig. 7 is a similar horizontal section showing the parts in a different position of the training.
Figure 8:
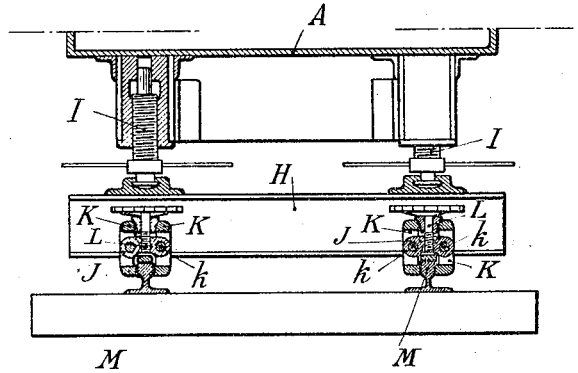
Fig. 8 is a vertical cross section drawn to the same scale as Figs. 5, 6 and 7, on the line VIII—VIII of Fig. 1.
Figure 11:
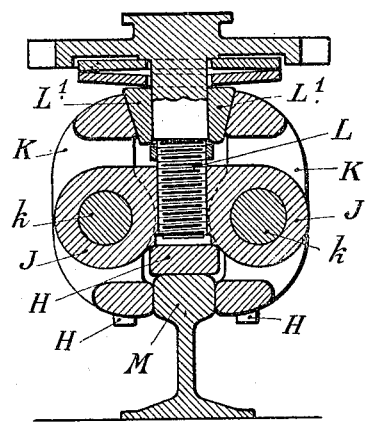
Figs. 11 and 12 are respectively vertical cross sections on the lines XI—XI and XII—XII of Fig. 9.
Figure 12:
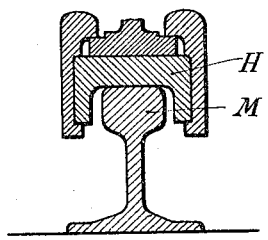

It will be readily understood that on actuating these gearings, the screw E will be moved longitudinally through the nut F which is held in the turntable-pivot D—$a^1$, whereby the said screw E may be moved for instance from the position shown in Figs. 2 and 6, into the position shown in Figs. 4 and 7.

The devices are provided for supporting the girder-like carriage A on the railway in addition to the trucks B C. These comprise independent soleplates H (Figs. 1, 8, 9 and 10) which constitute the support proper. The girder A rests during the firing of the gun on the upper surfaces of these soleplates through the medium of raisable screw-jacks I.

The soleplates H are provided with suitable devices for clamping the rails of the railway. These devices may be constructed for instance as shown in detail in Figs. 9 to 12. In the example shown, each soleplate comprises two clamping tongs for each rail. For this purpose nuts J formed on the soleplates H serve as supports for two fulcrum pins $k$ for jaws K. L is a screw provided with a wedge $L^1$. By means of this screw working in the nut J, the jaws K may be clamped or unclamped at will on and from the head M of the rail.

The soleplates H are provided with hooks $h$ by means of which they can be suspended for traveling from suitable members N permanently connected to the girder A.

In order to facilitate the unclamping of the soleplates H, after the supporting screw-jacks I have been raised, the said soleplates may be provided with rollers $h^1$ adapted to make contact with the rails of the railway. These rollers are carried at the ends of spring arms $h^2$. The springs $h^2$ are in tension when the soleplates are in their supporting position (Fig. 9) and thus these springs have an automatic tendency to raise the said soleplates as soon as the latter are relieved of the weight of the girder-like gun carriage.

In the firing position of the gun the soleplates H which are located on the two sides of a lower projection of the gun carriage A, are coupled by means of tie rods O, in such a manner as to clamp the carriage girder between them and be carried by it in its limited sliding movement due to the recoil of the gun.

Figure 9:
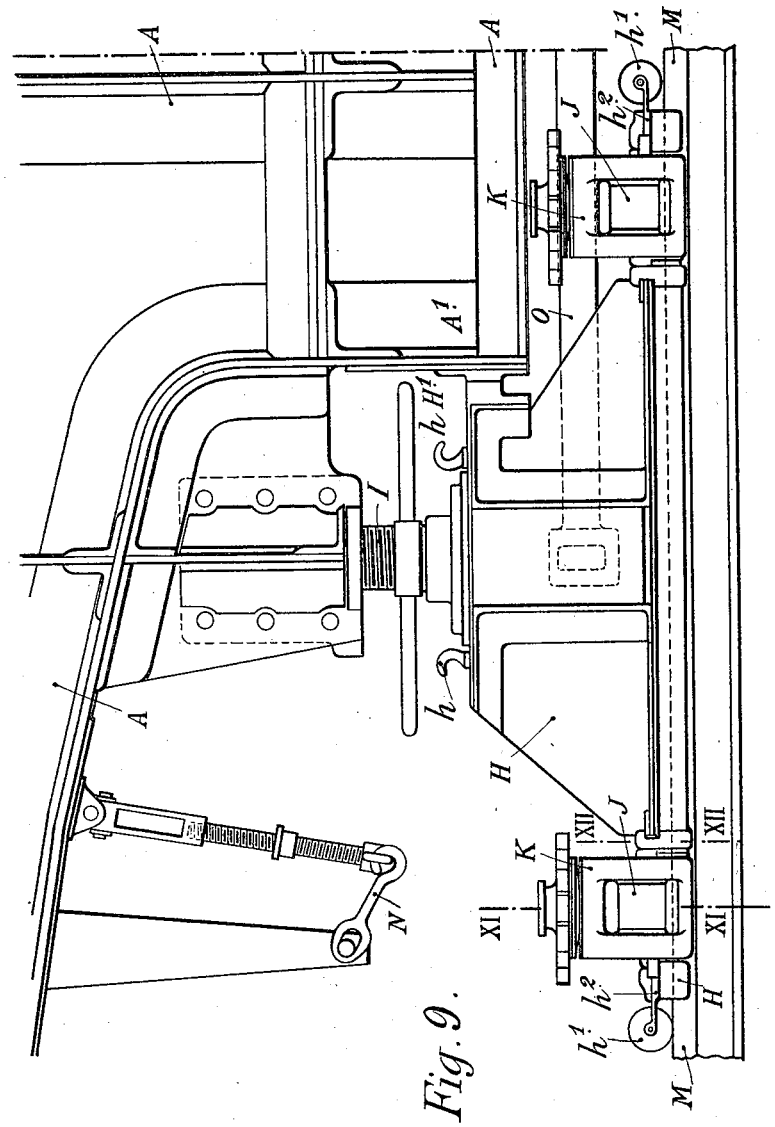
Fig. 9 is a partial side elevation drawn to a larger scale showing the details of the devices for supporting the girder-like gun carriage on the railway in the firing position of the gun.

The rear soleplates are formed on their front ends with circular bearing surfaces $H^1$ struck from the axis of the pivot $a$ as their geometric center. Against this circular surface there is adapted to bear a projection having a corresponding surface $A^1$ provided on the girder A (Figs. 3 and 9).

What I claim is:—

1. In an apparatus of the character described, the combination of a plurality of railway truck groups, and a girder-like gun carriage mounted to turn thereon on vertical pivots, with means for moving said carriage around one of its pivotal points independently of said truck-groups or other support.

2. In an apparatus of the character described, the combination of a plurality of railway truck-groups, and a girder-like gun carriage mounted thereon to turn in a horizontal plane, with a turn table pivotally supported by one of said truck-groups, and means for traversing the rear of said gun carriage across said turn table.

3. In an apparatus of the character described, the combination of a plurality of railway truck-groups, and a girder-like gun carriage mounted thereon to turn in a horizontal plane, with a turn-table pivotally supported by the rear one of said truck-groups, a recessed pivot member for the rear of said carriage on said turn table, a nut vertically pivoted in said recessed pivot member, and a horizontal traversing screw connected to the rear of said carriage and working in said nut, whereby the rear end of said gun carriage can be traversed across said turn table without altering the position of the truck-group carrying said turn table.

4. In an apparatus of the character described, the combination of forward and rearward railway trucks, and a girder-like gun carriage pivoted to each of said trucks by vertical pivots, with auxiliary devices for supporting said carriage on a railway, said devices comprising sole plates separable from the gun carriage for transportation, means for clamping said sole plates to the rails and means connecting said carriage to said sole plates when the parts are in firing position.

5. In an apparatus of the character described, the combination of forward and rearward railway trucks, and a girder-like gun carriage pivoted to each of said trucks by vertical pivots, with auxiliary devices for supporting said carriage on a railway, said devices comprising sole plates, means for clamping said sole plates to the rails, tie rods connecting said sole plates, and a downwardly projecting portion of said carriage clamped between said sole plates by said tie rods, whereby said sole plates are connected to and carried along by said carriage on recoil.

6. In an apparatus of the character described, the combination of forward and rearward railway trucks, and a girder-like gun carriage pivoted to each of said trucks by vertical pivots, with auxiliary devices for supporting said carriage on a railway, said devices comprising sole plates, clamping jaws carried by said sole plates for clamping said plates to the rails of a railway, screws carried by the sole plates, means operated by said screws to effect the clamping action of said jaws, and jack screws carried by said carriage and bearing on said sole plates.

7. In an apparatus of the character described, the combination of a plurality of railway trucks, and a girder-like gun carriage mounted on said trucks to turn in a horizontal plane, with additional devices to support said carriage on the rails of a railway when in firing position, said devices comprising a plurality of sole plates suspended beneath the carriage during transport, means clamping said sole plates to the rails for firing, tie rods connecting said plates, a depending portion of said carriage clamped between said plates when in firing position, whereby said plates are carried along by the carriage on recoil, and jack screws reacting between said carriage and plates.

In testimony whereof I have signed this specification.

EUGÈNE SCHNEIDER.

Copies of this patent may be obtained for five cents each, by addressing the "Commissioner of Patents, Washington, D. C."